United States Patent

Hüther et al.

[11] 4,426,966
[45] Jan. 24, 1984

[54] PRECOMBUSTION CHAMBER IN THE CYLINDER HEAD OF A DIESEL ENGINE

[75] Inventors: Werner Hüther, Karlsfeld; Wolfgang Krüger, Reichertshausen, both of Fed. Rep. of Germany

[73] Assignee: MTU Motoren-und Turbinen-Union, Munich, Fed. Rep. of Germany

[21] Appl. No.: 386,765

[22] Filed: Jun. 9, 1982

[30] Foreign Application Priority Data

Jun. 12, 1981 [DE] Fed. Rep. of Germany ....... 3123398

[51] Int. Cl.³ .............................................. F02B 3/00
[52] U.S. Cl. .................................... 123/286; 123/293; 123/270; 123/271; 123/254
[58] Field of Search ................. 123/270, 271, 254, 286

[56] References Cited

U.S. PATENT DOCUMENTS

| | | | |
|---|---|---|---|
| 2,205,751 | 6/1940 | Scherenberg | 123/254 |
| 2,696,199 | 12/1954 | Schmidt | 123/254 |
| 2,804,858 | 9/1957 | Schilling | 123/270 |
| 2,853,060 | 9/1958 | Hockel | 123/270 |
| 3,014,465 | 12/1961 | Dressler | 123/271 |
| 3,058,452 | 10/1962 | Espenschied | 123/271 |
| 3,257,994 | 6/1966 | Clements | 123/271 |
| 3,259,116 | 7/1966 | Bricout | 123/270 |
| 3,730,163 | 5/1973 | Elsbett | 123/270 |
| 3,895,613 | 7/1975 | Joshi | 123/254 |
| 4,325,334 | 4/1982 | Nishida | 123/270 |

FOREIGN PATENT DOCUMENTS

| | | | |
|---|---|---|---|
| 881272 | 6/1953 | Fed. Rep. of Germany | 123/270 |
| 2852448 | 6/1979 | Fed. Rep. of Germany | 123/270 |
| 1049460 | 12/1953 | France | 123/271 |
| 51-134958 | 11/1976 | Japan | 123/270 |
| 52-156900 | 12/1977 | Japan | 123/270 |

*Primary Examiner*—Ronald B. Cox
*Attorney, Agent, or Firm*—Posnack, Roberts, Cohen & Spiecens

[57] ABSTRACT

Precombustion chamber construction in a cylinder head of a diesel engine utilizing ceramic material to increase resistance to thermal stresses. A space is provided between the precombustion chamber construction and the cylinder head at least at the main combustion chamber of the diesel engine, and one or more ceramic bodies are shielded from the metal cylinder head and any other metal by thermal insulation to minimize thermal stresses and enable combustion in the precombustion chamber to take place at a higher temperature whereby the power/weight ratio and the efficiency of the engine are improved. The precombustion chamber construction in one embodiment is composed of axially successive parts, and at least the part nearest the main combustion chamber is made of the ceramic material and shielded as indicated.

6 Claims, 6 Drawing Figures

Fig.3
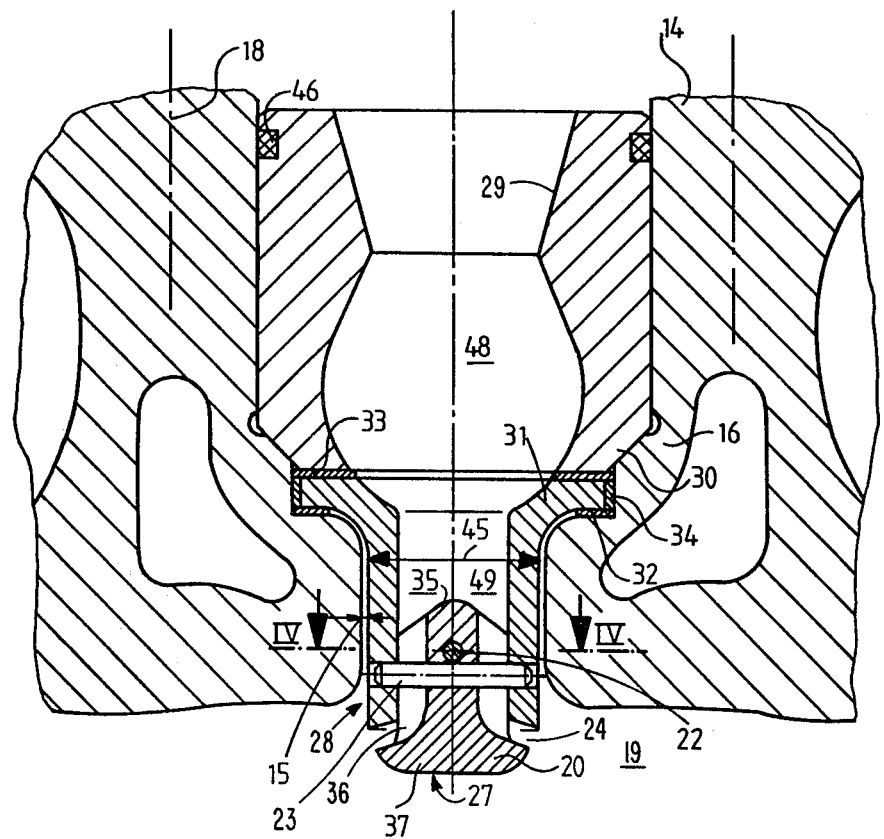
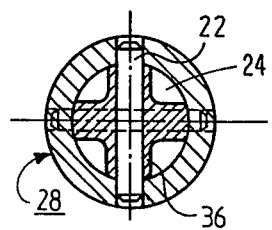
Fig.4

PRECOMBUSTION CHAMBER IN THE CYLINDER HEAD OF A DIESEL ENGINE

FIELD OF THE INVENTION

This invention relates to a precombustion chamber construction for a diesel engine particularly utilizing ceramic material.

While such precombustion chamber—generally a body of revolution—can be made exclusively of a ceramic material, a disadvantage is then seen in the fact that the precombustion chamber or its ceramic portion, on the one hand, abuts on or practically abuts on the cold or cooled cylinder head while on the other hand it projects into the hot main combustion space—this being the combustion space in the combustion cylinder of a Diesel engine—which gives rise to considerable thermal stresses that limit the thermal tolerance or the life of the precombustion chamber.

SUMMARY OF THE INVENTION

In a broad aspect the present invention provides means to augment the resistance of the precombustion chamber to heat.

In accordance with the invention, there is provided a precombustion chamber construction in a cylinder head of a diesel engine which comprises means in said cylinder head defining a precombustion chamber communicating with a main combustion chamber of the engine and including a member of ceramic material. Said means faces into the main combustion chamber and forms a space with said cylinder head at least in the region where said means faces into said main combustion chamber. Thermal insulation means insulates said ceramic member from said cylinder head.

The present invention provides the following effects and advantages: Said thermal stresses can be alleviated or eliminated. Combustion in the precombustion chamber can take place at a higher temperature, and the gas or fluid (gases and liquid fuel particles) in the precombustion chamber can be hotter before it is admitted to the main combustion space. The thermal tolerance of the precombustion chamber can be augmented, and the power/weight ratio and the efficiency of the diesel engine can be improved.

The precombustion chamber comes under considerable thermal stresses from the main combustion space, into which it projects, and in many cases it will be sufficient if one part of a multipiece precombustion chamber, namely that part nearest the main combustion space, is made of a ceramic material. This alone will provide said effects and advantages to a fair degree. These will nevertheless be improved if the respective successive part of the precombustion chamber is also made of a ceramic material. For holding or locating the various ceramic parts of the precombustion chamber, use is especially made of at least one pin and/or an outer end flange of a ceramic precombustion chamber part.

In a preferred construction a thermal insulation means is provided comprising one or more seals or sealing rings. These can be made of, e.g., asbestos, ceramic felt or, as a metal sleeve with asbestos, ceramic felt or the like inside.

The presence of a separate ceramic fluid or gas baffle connected to the adjacent part of the precombustion chamber by means of one or two retaining pins serves mainly to prevent the flow of heat from the gas baffle to said part of the precombustion chamber and, thus, to the cooled cylinder head, so that high stresses as a result of temperature gradients are prevented. Provision can be made for the gas baffle and the retaining pin or pins, and also for the other part or parts of the precombustion chamber, to expand freely and so minimize or prevent mechanical stresses caused by heating.

Said flow of heat in connection with the separate gas baffle and retaining pin or pins, will also be minimized if use is made of a highly heat-resistant metallic material, such as a nickel-base alloy, for the gas baffle. In a particular aspect of the present invention, however, the gas baffle is made of a ceramic material.

The preferred ceramic material of the precombustion chamber or of said part or parts thereof is silicon carbide SiC or silicon nitride $Si_3N_4$; use can alternatively be made, however, also of silicon-infiltrated silicon nitride and ceramic oxide materials, e.g., magnesium oxide MgO or aluminum oxide $Al_2O_3$, or aluminum titanate. This applies equally to the material of the retaining pin, when this is ceramic. The material for the retaining pin, however, can also be a highly heat-resistant metallic material, such as a nickel-base alloy. If made of a ceramic material, however, the gas baffle and the retaining pin will be able to sustain higher temperatures than if made of metal.

In further accordance with the invention, the gas baffle is of mushroom shape to provide a gas exit duct and a tapered fluid exit port. The retaining pin can be located within the ceramic body so that it is out of the flow of the hot gases, so that the material of the pin can, in many applications, be metal in lieu of ceramic. The stem of the mushroom, shaped gas baffle can be provided with longitudinal webs, and is not capable of angular movement relative to the part to which it is connected, so that a single retaining pin will be sufficient.

In a further embodiment of the invention, the gas baffle is incorporated directly into a tubular member of ceramic material which is provided with gas discharge ports near its closed end. This has the advantage of forming the ceramic body as a one piece member which will be of relatively simple construction and of relatively low expense in manufacture.

The precombustion chamber construction of the invention provides a first portion of relatively large outside diameter which contains the precombustion chamber itself either in entirety or in major portion thereof and a second portion of substantially smaller outside diameter. The second portion forms the space with the cylinder head and extends into the main combustion chamber and provides for discharge of precombusted gases into the main combustion chamber. The space between the second part and the cylinder head is in open communication with the main combustion chamber to minimize thermal exchange between the second part and the cylinder head. The second part contains a cylindrical duct which extends from the precombustion chamber to the outlets for the combusted gas and this cylindrical duct has a smaller diameter than the largest diameter of the precombustion chamber.

The material of the cylinder head, which normally is a steel or aluminum casting, will not normally retain the heat prevailing in the precombustion chamber region. The material for said metal parts of the precombustion chamber and of said metal insert, therefore, is a highly heat-resistant material, especially a nickel-base alloy.

The accompanying drawings illustrate embodiments of the precombustion chamber arranged in accordance with the present invention in a cylinder head.

BRIEF DESCRIPTION OF THE SEVERAL VIEWS OF THE DRAWING

FIG. 3 is a sectional view similar to FIG. 1 of a modified embodiment.

FIG. 4 is a sectional view taken on line IV—IV in FIG. 3.

DETAILED DESCRIPTION

Figure 1:
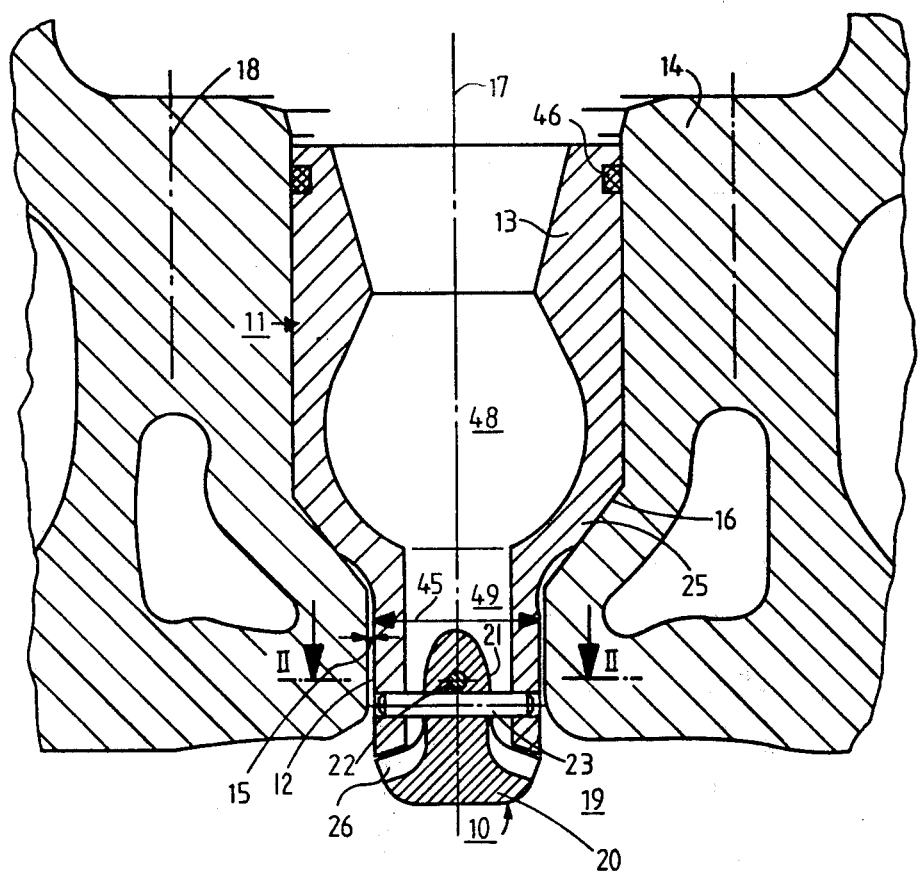
FIG. 1 is an elevational view in cross-section showing a first embodiment of the invention for a precombustion chamber construction utilizing a gas baffle.

Referring to FIG. 1, therein is seen a precombustion chamber construction according to the invention which comprises an oblong metal main member 11 containing a precombustion chamber 48 and a ceramic body 10 assembled in axial succession from member 11. The member 11 consists of two axially successive sections 12 and 13 having respective cylindrical outer surfaces, the section 12 having a smaller outer diameter 45 than the section 13. An annular gap or space 15 is formed between the section 12 and a metal cylinder head 14 of a diesel engine.

The cylinder head 14 bounds a main construction chamber 19 of the engine. The section 13 of member 11 is tightly seated in the cylinder head 14 without any spaces or gaps and is sealably engaged therein by annular sealing ring 46. The section 13 narrows conically to form the contiguous section 12. The cylinder head 14 has a conforming conical surface 16, against which the conical portion 25 is urged axially by means of bolts 18 extending parallel to the longitudinal center line 17 of the precombustion chamber. The bolts are indicated by chain dotted lines in FIG. 1 but are shown in detail in FIG. 6.

The ceramic body 10 is constituted as a gas baffle and is of mushroom shape. The ceramic body 10 does not make contact with the cylinder head 14, and it projects into the main combustion chamber 19. The body 10 comprises a cap 20 disposed inside the main combustion chamber 19 and a stem 21 received in a cylindrical hollow 49 in section 12 which communicates with precombustion chamber 48 and receives precombusted gases therefrom. The cap 20 forms a gas duct 24 with section 12 through which the precombusted gases can flow into the main combustion chamber 19. Two retaining pins 22,23 located in axially spaced planes are disposed at right angles to one another and extend through the stem 21 and gas duct 24 and are seated at their respective ends in section 12. The gas baffle 10 has four circumferentially spaced webs 26 which extend to the end of the gas duct 24 and divide the stream of gases into four individual streams. The webs 26 may be present in a greater or lesser number than the four shown and, for example, can achieve a divided flow with from three to ten webs. If the webs 26 are omitted, the end of the duct 24 is in the form of a circumferentially continuous annulus from which the stream of gases issues in continuous undivided flow. The end of the duct 24 defines a truncated cone opening at an obtuse angle towards the main combustion chamber 19 to produce a correspondingly conical, divided or continuous exit flow.

Preferably, the retaining pins 22,23 are made of ceramic material to withstand the high temperatures to which it is exposed, namely the stream of precombusted gases in duct 24 and the combustion products in the main combustion chamber 19. Effectively, the retaining pins serve as thermal insulation means insulating ceramic body 10 from cylinder head 14. This obviates high temperature stresses in ceramic body 10 by keeping the body out of thermal contact with the cooler cylinder head 14 which would establish a temperature gradient in body 10 which would greatly minimize its life.

The construction shown in FIG. 3 is similar to that in FIG. 1 and the same elements have been given the same reference characters and will not be described in detail. In FIG. 3 the precombustion chamber construction comprises a plurality of axially successive elements in which the member 11 in FIG. 11 is replaced by metal member 29 and ceramic member 28. The ceramic member 28 has an outer diameter 45 which is less than the outer diameter of member 29. A ceramic body 27 is secured to ceramic member 28. Annular space or gap 15 is provided between the ceramic member 28 and the metal cylinder head 14. The metal member 29 is tightly seated in the cylinder head 14. The member 29 has a conical end portion 30 extending towards member 28. The cylinder head 14 has a correspondingly contoured conical surface 16, against which the conical end portion 30 is urged axially by means of bolts 18.

The ceramic body 27 is similar to ceramic body 10 in FIG. 1 and serves as a gas baffle for flow of combusted gases to the main combustion chamber 19, via the gas duct 24 formed between body 27 and member 28. The end of the duct facing into the main combustion chamber 19 defines the shape of a truncated cone. The stem 35 of body 27 has four longitudinal webs 36 which are angularly spaced by 90° and which extend into the member 28 such that the retaining pins 22, 23 extending through stem 35 also extend in the longitudinal webs 36, as seen in FIG. 4, and therefore are not directly exposed to the precombustion gases flowing in duct 24, but are protected by the ceramic material of webs 36. This makes it possible to construct the pins of a highly heat-resistant metallic material instead of ceramic as in FIG. 1. It is also possible to employ a single retaining pin as this will secure body 27 to member 28 in fixed angular position.

Member 28 has an outer end flange 31 facing axially juxtaposed member 29. A thermally insulating annular sealing means is interposed at both radial faces and at the circumference of the outer end flange 31 in a recess in the cylinder head 14, on the one hand, and between the menber 29 on the other hand. The sealing means comprises three gasket rings 32, 33 and 34 which serve to thermally insulate the member 28 from the member 29 and cylinder head 14 and reduce the flow of heat from member 29 to member 29 and cylinder head 14 thereby minimizing thermal stress in member 28 and body 27 secured thereto due to thermal gradients. The rings 32, 33 and 34 also perform a concomitant function. Namely, in order to relieve thermal and mechanical stresses in the member 28, the axial preload exerted by the metal member 29 is mainly transferred to the cylinder head, via the conical surface 16, and due to the presence of the rings 32, 33 and 34 only part of the clamping pressure that is applied by the metal member 29, through the bolts 18, comes to bear on the ceramic member 28 and especially the end flange thereof. This prevents the member 28 from bursting apart.

Figure 5:
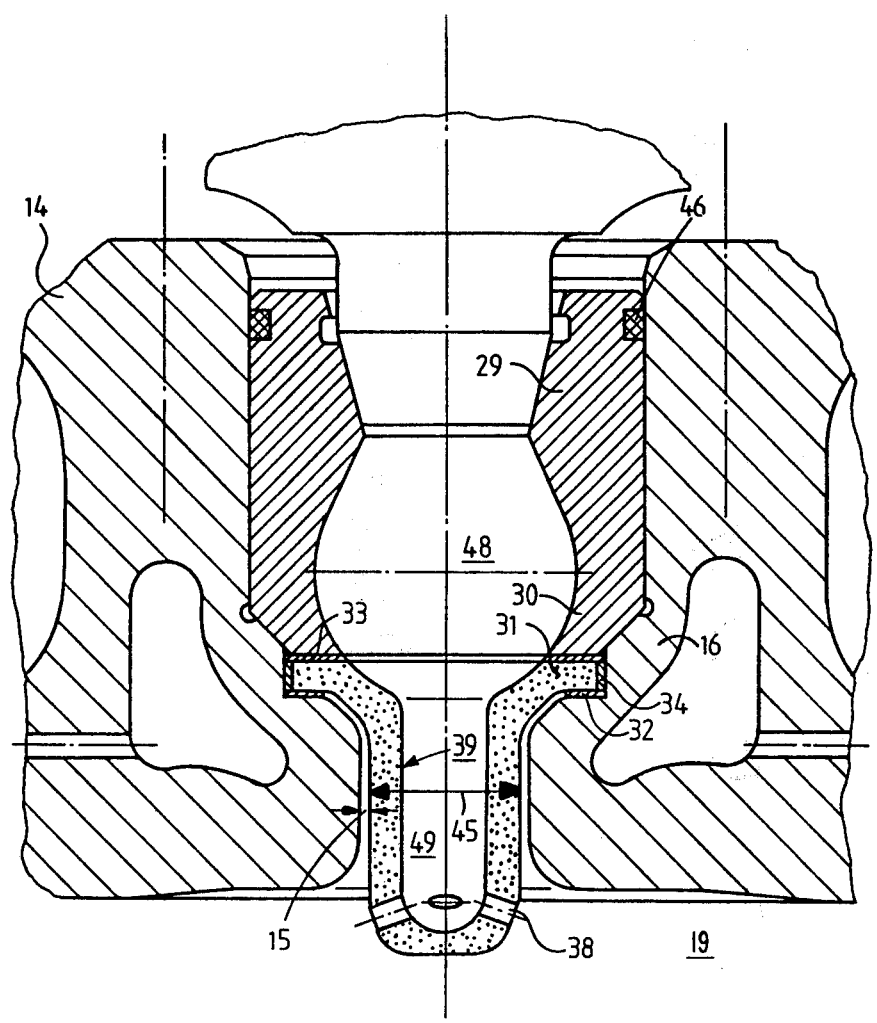
FIG. 5 is a sectional view similar to FIG. 1 of another embodiment.
Figure 6:
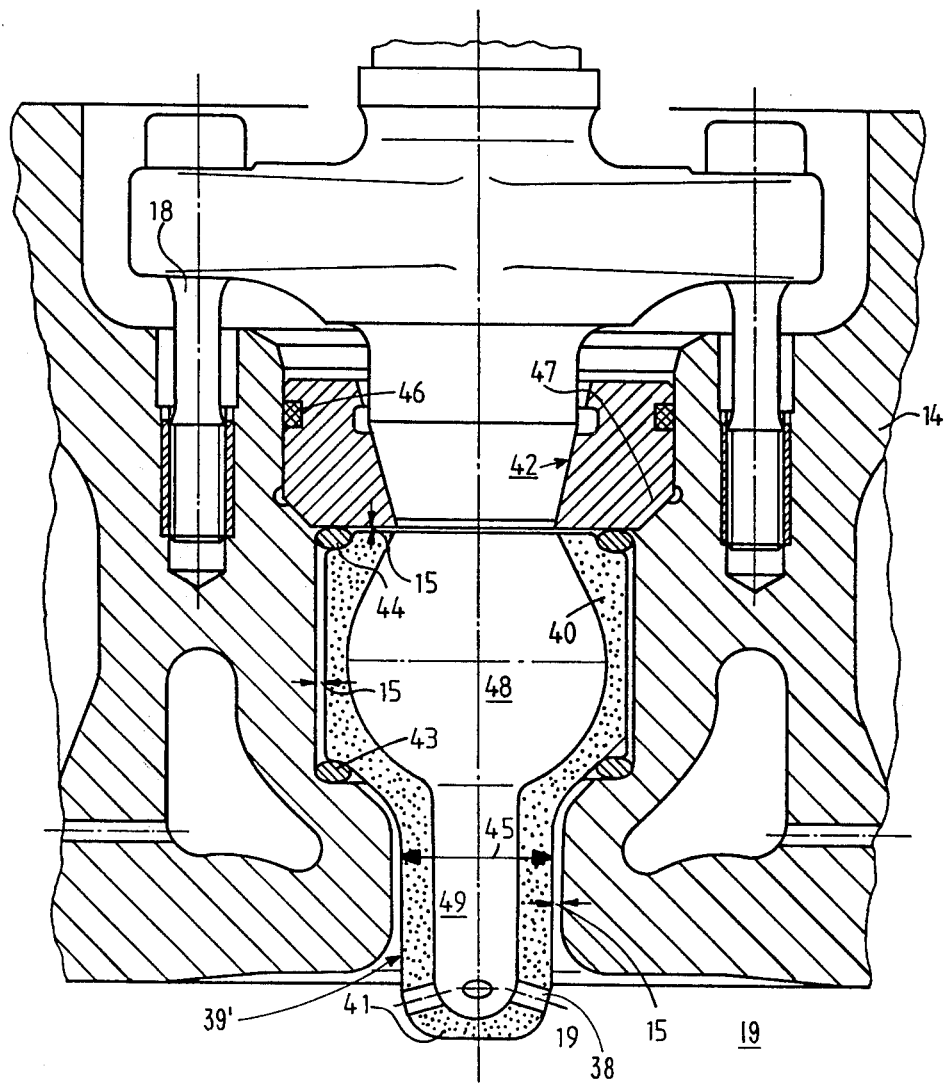
FIG. 6 is a sectional view similar to FIG. 5 of still another embodiment.

In FIGS. 5 and 6, a modified cnstruction is shown wherein the ceramic baffles in FIGS. 1 and 3 are replaced by a closed tubular body which is itself mounted within the cylinder head and is provided with gas exit ports or ducts 38, projecting into the main combustion chamber 19 for conveying precombusted gases from the hollow 49 extending to the precombustion chamber 48. The ports or ducts 38 are four in number in the embodiments in FIGS. 5 and 6 and are angularly spaced by 90° from one another. A greater or lesser number of ports or ducts 38 can be employed and six to eight ducts are preferred. The ports or ducts 38 are disposed along a conical contour of the ceramic body.

With reference now to FIG. 5, the axially successive precombustion chamber parts include member 29 which may be made of metal or ceramic material and ceramic body 39 having a smaller outer diameter 45 than the member 29 similar to member 28 in FIG. 3. Annular space 15 is again provided as in FIG. 3. Apart from the omitted gas baffle 27 and the closed end of body 39, which takes its place, the construction in FIG. 3 and the description thereof also applies to FIG. 5, particularly with regard to the rings 32, 33 and 34 and the clamping pressure of member 29 against cylinder head 14.

Figure 2:
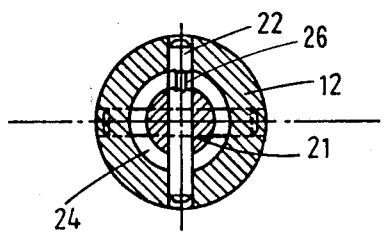
FIG. 2 is a sectional view partly broken away taken along line II—II in FIG. 1.

The precombustion chamber construction in FIG. 6 comprises a one-piece ceramic body 39' including section 40 containing combustion chamber 48 and cylindrical section 41 having a smaller outer diameter 45 than the section 40. The clamping pressure applied by bolts 18 to the body 39 in the direction of the main combustion chamber 19 acts through a metal insert member 42 having a conical end portion 47 similar to that of FIG. 2. As in the previous embodiments, an annular space 15 is provided which entirely surrounds the ceramic body 39'. An annular sealing ring 43 is interposed between the ceramic body 39 and the cylinder head 14 and a second annular sealing ring 44 is interposed between ceramic body 39 and cylinder head 14 and insert member 42.

The portion of space 15 between ceramic body 39' and insert member 42 is slightly less than the space surrounding the periphery of the body 39' because of the axial pressure applied to ring 44 upon clamping of insert member 42 against cylinder head 14. The sealing rings 43 and 44 are provided at the axial ends of the section 40 and are constructed of thermally insulating and thrust-resistant material.

At the sections 12 (FIG. 1) and 40 (FIG. 6) and the members 28 (FIG. 3) and 39 (FIG. 5), not including the outer end flange 31, the space 15 is maintained circumferentially over the entire length of the sections or members and in the transitional area leading to the contiguous section 13 (FIG. 1) or 40 (FIG. 6) or outer end flange 3 (FIGS. 3 and 5).

In the embodiments of FIGS. 1, 3 and 5 the precombustion chamber 48 and hollow 49 are collectively formed in a plurality of elements whereas in FIG. 6 the precombustion chamber 48 and hollow 49 are formed in body 39'.

Although the invention has been disclosed in relation to specific embodiments thereof, it will become apparent to those skilled in the art that numerous modifications and variations can be made within the scope and spirit of the invention as defined by the attached claims.

What is claimed is:

1. A precombustion chamber construction in a cylinder head of a diesel engine, the cylinder head bounding a main combustion chamber of the engine, said precombustion chamber construction comprising means in said cylinder head defining a precombustion chamber communicating with the main combustion chamber via a flow passage and including a member in said cylinder head provided with said gas passage and a body supported by said member and facing into said main combustion chamber to form a gas baffle for combustion products passing through the gas passage from the precombustion chamber to the main combustion chamber, a mushroom shaped body including a cap disposed in said main combustion chamber and a stem received in said member, said body and member defining a gas duct therebetween, said mushroom shaped body comprising four longitudinal webs at an angular spacing of 90 degrees, said webs projecting from said stem to said member, and at least one transversely extending pin extending through a respective pair of webs and said stem into said member and being covered by said webs in said gas duct.

2. A precombustion chamber construction as claimed in claim 1 wherein said member, said pin and said mushroom shaped body are made of ceramic material.

3. A precombustion chamber construction as claimed in 2 comprising thermal insulation means between said member and said cylinder head.

4. A precombustion chamber construction as claimed in claim 1 further comprising a second transversely extending retaining pin, the first and second pins being axially spaced and disposed at right angles to one another, said pins extending through said stem of said gas baffle and respective pins of webs and having opposite ends seated in said member.

5. A precombustion chamber construction as claimed in claim 1 wherein said member is an oblong metal element containing said precombustion chamber and including first and second axially successive sections, the second section being closer to the main combustion chamber and being of smaller outer diameter than the first section, said gas baffle being secured to said second section, said second section forming an annular space with said cylinder head.

6. A precombustion chamber construction as claimed in claim 5 wherein said oblong metal element is a body of revolution.

* * * * *